(No Model.)

W. G. LEWIS.
COLTER ATTACHMENT FOR PLOWS.

No. 476,396. Patented June 7, 1892.

Witnesses
Chas. A. Ford
J. B. Liggus

Inventor
W G Lewis.
By his Attorneys,
C A Snow & Co.

UNITED STATES PATENT OFFICE.

WILLIAM G. LEWIS, OF CALEDONIA, IOWA.

COLTER ATTACHMENT FOR PLOWS.

SPECIFICATION forming part of Letters Patent No. 476,396, dated June 7, 1892.

Application filed February 3, 1892. Serial No. 420,215. (No model.)

*To all whom it may concern:*

Be it known that I, WILLIAM G. LEWIS, a citizen of the United States, residing at Caledonia, in the county of Ringgold and State of Iowa, have invented a new and useful Colter Attachment for Plows, of which the following is a specification.

My invention relates to improvements in plows of that class known as "listers," and has particular reference to a colter attachment for the same.

One object of the invention is to provide a cheap and simply-constructed colter attachment adapted to be removably applied to the points of listing-plows, whereby the same are rendered more durable or of lighter draft and steadied in their work.

Other objects and advantages of the invention will appear in the following description, and the novel features thereof will be particularly pointed out in the claim.

Figure 1:
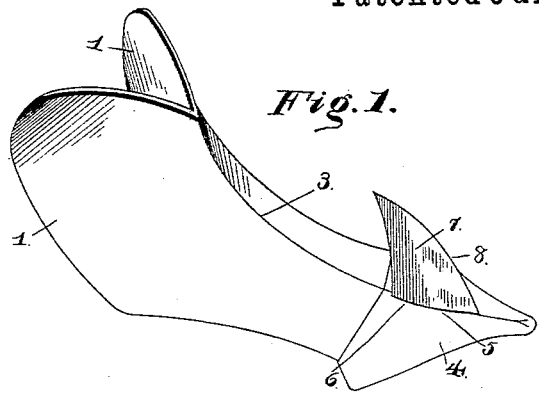
Figure 2:
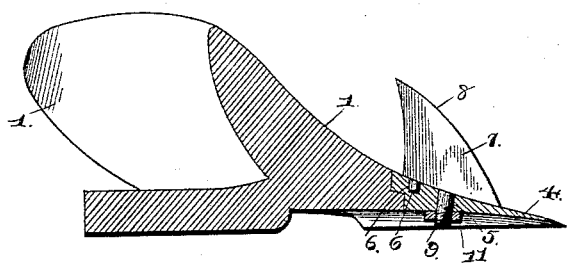
Figure 3:
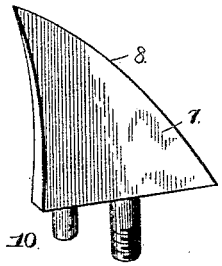

Referring to the drawings, Figure 1 is a perspective of a listing-plow provided with my improved attachment. Fig. 2 is a vertical longitudinal section of the same. Fig. 3 is a detail in elevation of the attachment.

Like numerals of reference indicate like parts in all the figures of the drawings.

The opposite mold-boards or wings 1 of the plow converge at their front edges and meet to form the seam or angle 3, which takes the wear as the plow is forced through the soil and is the first part of the listing-plow to wear out and become impaired. To the front end of the mold-board is secured the usual point 4, and the same has its upper surface so shaped as to form a continuation of the seam 3—that is, the point declines at each side of its longitudinal center. The point is provided at its center with a perforation 5 and in rear of the same with a countersunk socket or mortise 6.

The colter 7 is triangular when viewed in side elevation, comprising the horizontal base portion, the rear vertical edge, and the front inclined cutting-edge 8, which is beveled, as shown. At its lower edge the colter is provided with a depending threaded cam 9 and in rear of the same with a shorter plain tenon or stud 10.

To attach the colter, the threaded tenon is passed through the perforation 5, while the short tenon fits into the mortise 6, so that by applying a single nut 11 to the lower end of the threaded tenon the attachment is secured snugly in position.

By the employment of the attachment it will be obvious that the soil will be sharply cut from the bottom of the furrow to the top of the soil and that it will be equally divided, falling to each side of the colter upon the point and wings, and not to any marked extent be brought in contact with the seam of the listing-plow. In this manner the wear is directed to the wings or mold-boards 1, which are designed to sustain the same, and the seam is preserved, thus adding greatly to the durability of the plow. The colter, as will be observed, also greatly aids in steadying the plow and by sharply cutting the soil, instead of depending upon the obtuse seam 3, greatly lessens the draft of the plow as a whole.

Having described my invention, what I claim is—

The listing-plow comprising the opposite converging mold-boards terminating in a point comprising opposite converging wings, the meeting edges of the wings and mold-boards being in line and the meeting edge of the point being provided with a threaded perforation and with a plain mortise, combined with a substantially triangular colter mounted upon and rising vertically from the meeting edge of the point, said colter being provided with a front convexed reduced cutting-edge and upon its under side with a threaded tenon taking in the perforation and a plain tenon taking in the mortise, and a nut located upon the threaded tenon below the point, the cutting-edge of the colter being in line with the meeting edges of the mold-board and wings, substantially as specified.

In testimony that I claim the foregoing as my own I have hereto affixed my signature in the presence of two witnesses.

WILLIAM G. LEWIS.

Witnesses:
H. L. GOODMAN,
F. E. SHELDON.